US010708300B2

(12) United States Patent
Rodrigues

(10) Patent No.: US 10,708,300 B2
(45) Date of Patent: Jul. 7, 2020

(54) DETECTION OF FRAUDULENT ACCOUNT USAGE IN DISTRIBUTED COMPUTING SYSTEMS

(71) Applicant: Microsoft Technology Licensing, LLC, Redmond, WA (US)

(72) Inventor: John Rodrigues, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 146 days.

(21) Appl. No.: 15/454,568

(22) Filed: Mar. 9, 2017

(65) Prior Publication Data

US 2018/0124105 A1 May 3, 2018

Related U.S. Application Data

(60) Provisional application No. 62/414,369, filed on Oct. 28, 2016.

(51) Int. Cl.
*H04L 29/06* (2006.01)
*H04W 12/12* (2009.01)
(Continued)

(52) U.S. Cl.
CPC ........ *H04L 63/1466* (2013.01); *G06Q 50/01* (2013.01); *G06Q 50/265* (2013.01);
(Continued)

(58) Field of Classification Search
None
See application file for complete search history.

(56) References Cited

U.S. PATENT DOCUMENTS 7,904,941 B2 3/2011 Jagadeesan et al.
7,991,957 B2 8/2011 Mercer
(Continued)

FOREIGN PATENT DOCUMENTS

WO 2016067117 A1 5/2016

OTHER PUBLICATIONS

Bing Hu, et al., Protecting Your Children from Inappropriate Content in Mobile Apps: An Automatic Maturity Rating Framework, 2015, CIKM Oct. 19-23, 2015, Melbourne, Australia, pp. 1111-1120. (Year: 2015).*

(Continued)

*Primary Examiner* — Luu T Pham
*Assistant Examiner* — Edward X Long
(74) *Attorney, Agent, or Firm* — Liang IP, PLLC

(57) ABSTRACT

Techniques for detecting fraudulent account usage without accessing user content associated with user accounts are disclosed herein. In one embodiment, a method includes receiving a report indicating fraudulent account usage related to an account of the computing service and in response to the received report, disallowing access to any content items associated with the account without disabling access to the account. While access to the content items is disallowed, collecting usage data related to the account or the content items and developing a model representing an activity profile of accessing the account or the content items. The method further includes detecting additional fraudulent account usage based on the developed model without scanning content items in the additional accounts.

19 Claims, 8 Drawing Sheets

(51) Int. Cl.
*G06Q 50/00* (2012.01)
*G06Q 50/26* (2012.01)
(52) U.S. Cl.
CPC .......... *H04L 63/10* (2013.01); *H04L 63/1425* (2013.01); *H04W 12/12* (2013.01)

(56) References Cited

U.S. PATENT DOCUMENTS

| | | |
|---|---|---|
| 8,209,381 B2 | 6/2012 | Sinn et al. |
| 8,601,596 B2 | 12/2013 | Wu et al. |
| 8,984,151 B1 | 3/2015 | Hsieh et al. |
| 9,009,834 B1 | 4/2015 | Ren et al. |
| 9,053,416 B1 | 6/2015 | De Leo et al. |
| 9,407,652 B1* | 8/2016 | Kesin ................. G06N 7/005 |
| 10,044,745 B1* | 8/2018 | Jones ................. H04L 63/1433 |
| 2008/0319889 A1* | 12/2008 | Hammad ................. G06Q 20/04 705/35 |
| 2010/0076922 A1 | 3/2010 | Hariharan et al. |
| 2010/0161734 A1 | 6/2010 | Wang |
| 2010/0169972 A1* | 7/2010 | Kuo ................. G06F 21/564 726/23 |
| 2014/0019550 A1 | 1/2014 | Whitney et al. |
| 2014/0041055 A1 | 2/2014 | Shaffer et al. |
| 2014/0045456 A1* | 2/2014 | Ballai ................. H04W 12/12 455/410 |
| 2014/0280570 A1 | 9/2014 | Sutton et al. |
| 2015/0143466 A1 | 5/2015 | Zacher et al. |
| 2015/0319185 A1 | 11/2015 | Kirti et al. |
| 2016/0203316 A1 | 7/2016 | Mace et al. |
| 2018/0007069 A1* | 1/2018 | Hunt ................. H04L 63/1416 |
| 2018/0097828 A1* | 4/2018 | Coskun ................. H04L 63/1425 |

OTHER PUBLICATIONS

Masson et al., Posting behavior in Social Networks and Content Active Filtering, IEEE/ACM International Conference on Adances in Social Networks Analysis and Mining, Aug. 25-28, 2015, Paris, France. pp. 1555-1562. (Year: 2015).*

"International Search Report and Written Opinion Issued in PCT Application No. PCT/US2017/057783", dated Dec. 13, 2017, 12 Pages.

Benevenuto, et al., "Detecting Spammers and Content Promoters in Online Video Social Networks", In Proceedings of the 32nd international ACM SIGIR conference on Research and development in information retrieval, Jul. 19, 2009, pp. 620-627.

\* cited by examiner

| Type of prohibited content | Access IP address | Creation IP address | Shared IP address | Device/ Browser type | Account Name |
|---|---|---|---|---|---|

| File Structure | Meta Data | Age of account | Shared with | ••• | Account type |
|---|---|---|---|---|---|

*FIG. 4* ated account to the service provider. The service
provider can then evaluate each received report and deter-
mine what actions to take.

DETECTION OF FRAUDULENT ACCOUNT USAGE IN DISTRIBUTED COMPUTING SYSTEMS

CROSS-REFERENCE TO RELATED APPLICATION(S)

This application is a non-provisional application of and claims priority to U.S. Provisional Application No. 62/414,369, filed on Oct. 28, 2016, the disclosure of which is incorporated herein in its entirety.

BACKGROUND

Computing devices such as servers, desktop computers, tablets, and smartphones are increasingly interconnected with one another via the Internet or other computer networks. The interconnection allows users to easily communicate and share content with one another. For example, a user can upload and store photos, videos, documents, or other types of content to a cloud-based storage service, such as OneDrive® and Google Drive®, and share the stored content with friends, families, or the public.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud or other types of computing service providers typically implement service agreements that can restrict usage of any provided computing services due to legal, policy, service health, or other considerations. For instance, providers of cloud storage services can impose service agreements that prohibit fraudulent usage of cloud storage services for storing and/or sharing certain types of content. Examples of such prohibited content can include child pornography, hate speech, copyrighted content, speech that incites violence, etc.

Such prohibited content, however, can be difficult to detect. Providers of cloud storage services may decide not to scan any stored content in order to protect user privacy or to comply with local laws. Even when detected, such fraudulent usage can persist. For example, some service providers can institute a "notice-and-takedown" approach. According to this approach, when a service provider determines that any reported content is indeed prohibited, the service provider can take down or close the account that is hosting the prohibited content. As such, the prohibited content is no longer accessible to other users. Such a technique, however, can be undermined by moving the prohibited content from one account to another. Thus, as soon as one fraudulent account is closed down, another may be activated in its place.

Several embodiments of the disclosed technology are directed to a technique for detecting fraudulent usage of computing services without scanning user content or otherwise compromising user privacy. Examples of such computing services can include social network services, cloud storage services, video hosting services, web hosting services, or other suitable types of services. The disclosed technology can include receiving notifications of prohibited content from users, government entities, or other suitable sources. For example, users can encounter prohibited content shared, for example, on a social network such as Facebook, and report or flag the prohibited content and associated account to the service provider. The service provider can then evaluate each received report and determine what actions to take.

Unlike the "notice-and-takedown" approach, the technique according to the disclosed technology can include "corrupting" the data in the reported account, i.e., rendering the prohibited content in the reported account unavailable or inaccessible to other users without taking down or closing the reported account. The technique can also include collecting and storing data related to usage, access, behavior, or other characteristics of the account prior to and/or subsequent to corrupting the fraudulent content in the account. Such data collection can continue until activities on the account cease or for a predetermined period of time. Examples of collected data can include the following:

IP address (e.g., first 3 octets) of login activity;
  IP address (e.g., first 3 octets) during creation of the account;
  IP addresses (e.g., first 3 octets) of all shared users trying to access the content before and after corrupting data in the account;
  Device type and/or browser used for accessing the prohibited content;
  Device type and/or browser creating the content and/or the account;
  Account name hosting the prohibited content;
  Accounts that have accessed the prohibited content;
  Folder structure (e.g., number, nesting patterns, etc.) of the account;
  File structure in the account;
  Number of files, types of files (e.g., file extensions), size of files, or other characteristics of the prohibited content in the account;
  Percentage of account shared versus not shared;
  Embedded meta-data of the prohibited content (e.g., type of camera used, resolution, or image/video dimensions);
  Age of the account;
  Age of the prohibited content uploaded and/or shared;
  Shared globally versus shared explicitly with other accounts/users;
  Use of other features on the account or the lack thereof (e.g. single device only, tags, extra folder, etc.);
  Free or premium account; or
  How long before the account owner tries to disable or other users stop visiting the content.

The foregoing example data can be collected anonymously or non-anonymously with user consent. For example, during account registration, a user can be prompted for participating or opting out the data collection process. While consenting for such data collection, users can choose to send the information anonymously or non-anonymously. Upon user consent, such data can then be collected. When the collected usage data is not anonymous, the collected data can be anonymized to remove all personal identification information to safeguard personal privacy of the users. For example, the IP addresses listed above can be anonymized by removing all digits after the first two or three octets. In other embodiments, the collected data can also be aggregated or anonymized in other suitable manners in order to safeguard user privacy.

The technique can then include analyzing the collected data associated with the reported account and other reported accounts to determine one or more commonalities among these accounts. In certain embodiments, a statistical analysis can be performed on the collected data to determine a distribution or probability of a shared characteristic of the reported accounts. As one example, speech inciting violence may be shared 85% of the time with everyone right after the content is uploaded from an Android device. In another example, copyrighted content may be shared 90% of the time via a peer-to-peer sharing service. In other embodiments, graph-based clustering, bag-of-pattern, or other suitable techniques can also be applied to determine the one or more commonalities among the accounts.

Based on the determined one or more commonalities, the technique can then include building a model of account behavior that indicates fraudulent usage with certain confidence levels. For instance, the model can indicate that an account shared with everyone right after uploading content from an Android device having a particular IP address range has a 99% chance of containing speech inciting violence. The model can also be continuously or periodically updated based on newly received indication and data related to the accounts via machine learning, manual update, or other suitable techniques.

The technique can further include blocking or otherwise disabling fraudulent account usage based on the built model. In certain embodiments, when a user attempts to activate an account or share content in the account, the technique can include comparing account activity characteristics with the model. If the account activity characteristics match or substantially match the model, the technique includes corrupting data in the account, or otherwise blocking sharing of content in the account automatically. In other embodiments, the account can also be put in a probation state in which an amount of sharing can be limited from the account until the account has existed for a threshold period. The limited sharing can be based on a daily sharing quota, a percentage of accounts/users not shared, etc. In yet other embodiments, the technique can also include developing a social graph among the reported accounts and determine a pattern of how such accounts interact with one other. Based on the determined pattern, the technique can include blocking additional accounts even before content sharing from these accounts are attempted. In further embodiments, the technique can include suspending a suspected account and allow the account be re-activated upon successful completion of certain user verification procedures.

Several embodiments of the disclosed technology can detect and interrupt fraudulent account usages of computing services without compromising user privacy. By maintaining a reported account associated with fraudulent account usage accessible, several embodiments of the disclosed technology can collect data with valuable insight into how such fraudulent account usage behave in the computing system. Based on the collected data, a model representing behavioral characteristics of the fraudulent account usage can be developed and used to automatically block further fraudulent account usage.

BRIEF DESCRIPTION OF THE DRAWINGS

FIG. 4 is an example of a data structure of usage data in accordance with embodiments of the disclosed technology.

DETAILED DESCRIPTION

Figure 1:
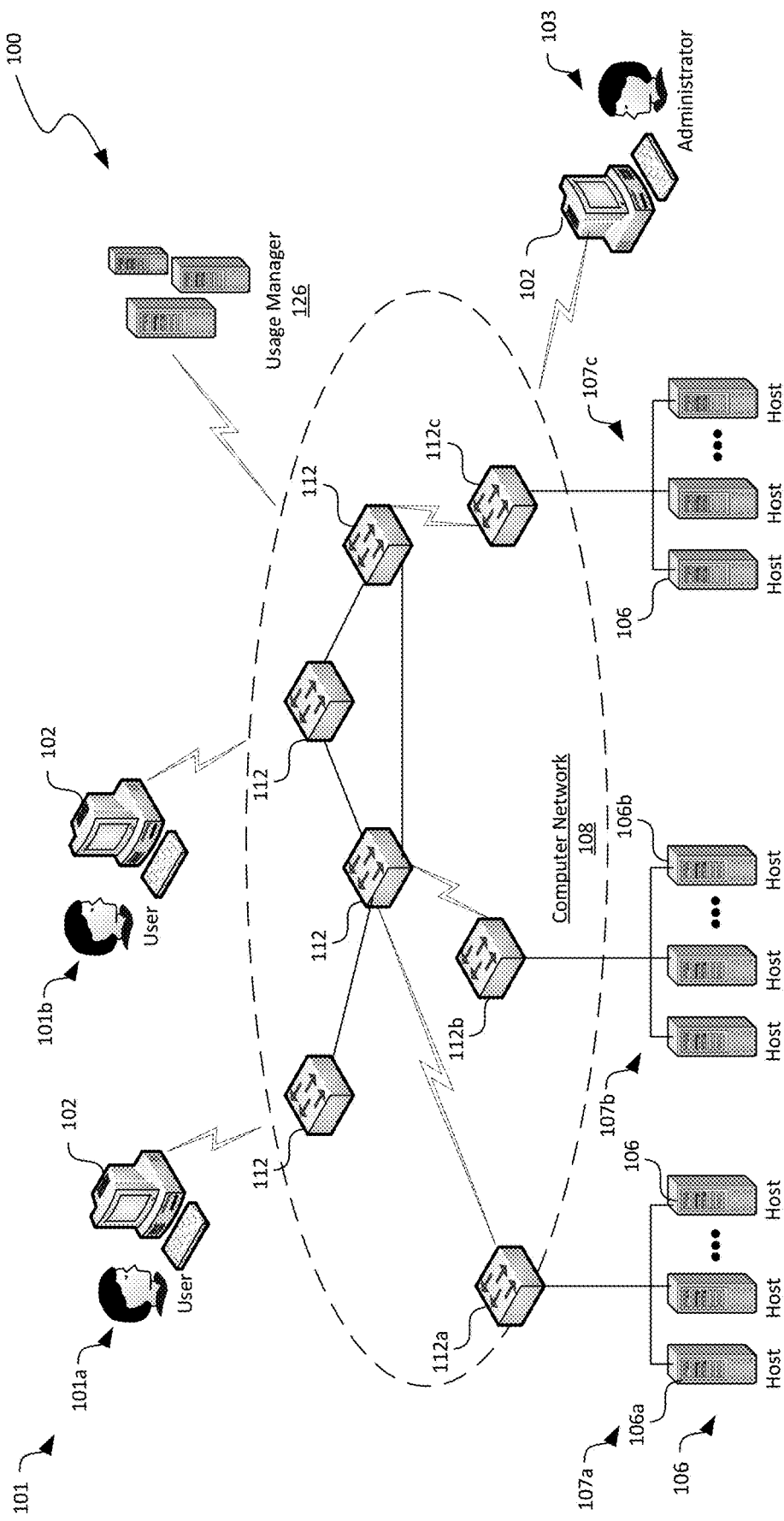
FIG. 1 is a schematic diagram illustrating a distributed computing system implementing detection of fraudulent account usage in accordance with embodiments of the disclosed technology.

Certain embodiments of systems, devices, components, modules, routines, data structures, and processes for detection of fraudulent account usage in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "computing system" or "distributed computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device (e.g., a server) configured to implement, for instance, one or more virtual machines, virtual storage devices, or other suitable virtualized components.

Also used herein, the term "account" or "user account" generally refers to a collection of data associated with a particular user in a multi-user computer system and/or computing service. The collection of data allows a user to authenticate to the computer system and/or computing service and to access resources provided by the computer system and/or computing service. Examples of the collection of data include (i) a username, a login name, a screen-name, a nickname, a handle or other suitable user identifier and (ii) a password, a secret answer, a digital key, or other suitable types of credential data.

A user can identify him/herself with the user identifier and authenticate to a computer system and/or computing service with the credential data. Once authenticated, access to certain computing resources (e.g., other user accounts or stored content) can be granted to the user. In certain embodiments, a user can have multiple user accounts, for example, by registering with a computer system or computing service with multiple user identifiers. In other embodiments, multiple users can have a single user account, for example, by sharing a set of username and credential data. In further embodiments, multiple users can individually have one or more user accounts.

Further used herein, the term "content" generally refers to data representing information accessible via a computer network. For example, content can include a file or content item containing data representing text, images, sounds, videos, or animations stored in a network repository and accessible via a computer network. In another example, content can also include one or more webpages of a website accessible via a computer network. In additional examples, content can include blog pages, discussion forums, electronic commerce sites, or other suitable types of digital resources.

Computing service providers typically implement service agreements that can restrict usage of any provided computing services due to legal, policy, or other suitable considerations. For instance, providers of cloud storage services typically impose service agreements that prohibit fraudulent usage of cloud storage services for storing and/or sharing certain types of prohibited content. Such prohibited content, however, can be difficult to detect. Providers of cloud storage services may decide not to scan any stored content in order to protect user privacy or to comply with local laws. Even when detected, such fraudulent usage can still persist by, for example, moving the prohibited content from one account to another.

Several embodiments of the disclosed technology are directed to a technique for detecting fraudulent usage of computing services without scanning user content or otherwise compromising user privacy. The disclosed technology can include, in response to receiving notifications reporting prohibited content in an account from users, government entities, or other suitable sources, "corrupting" data in the reported account, i.e., rendering the prohibited content in the reported account unavailable to other users without taking down or closing the reported account. The technique can also include continuing to collect and store data related to usage, access, behavior, or other characteristics of the account prior to and/or subsequent to corrupting data in the account.

The technique can then include analyzing the collected data associated with the reported account and other reported accounts to determine one or more commonalities among these accounts. Based on the determined one or more commonalities, the technique can include building a model of account behavior that indicates fraudulent usage with certain confidence levels. For instance, the model can indicate that an account shared with everyone right after uploading content from an Android device having a particular IP address range has a 90% chance of containing speech inciting violence. The model can also be continuously or periodically updated based on newly received indication and data related to accounts via machine learning, manual update, or other suitable techniques. The technique can further include blocking or otherwise disabling fraudulent account usage based on the built model. As such, several embodiments of the disclosed technology can detect fraudulent account usage without scanning user content to protect user privacy, as described in more detail below.

FIG. 1 is a schematic diagram illustrating a distributed computing system 100 implementing detection of fraudulent account usage in accordance with embodiments of the disclosed technology. As shown in FIG. 1, the distributed computing system 100 can include a computer network 108 interconnecting a plurality of hosts 106, client devices 102 corresponding to users 101 or administrator 103, and a usage manager 126. Even though particular components of the distributed computing system 100 are shown in FIG. 1, in other embodiments, the distributed computing system 100 can also include additional and/or different components. For example, the distributed computing system 100 can also include multiple network storage devices, maintenance managers, and/or other suitable components (not shown).

The client devices 102 can individually include a computing device that facilitates the users 101 to access to the computing services provided by the hosts 106 via the computer network 108. In the illustrative embodiment, the client devices 102 individually include a desktop computer. In other embodiments, the client devices 102 can also include laptop computers, tablet computers, smartphones, or other suitable computing devices. Even though two users 101 and an administrator 103 are shown in FIG. 1 for illustration purposes, in other embodiments, the distributed computing system 100 can facilitate any suitable number of users 101 and/or administrators 103 to access the computing services provided by the hosts 106 via the computer network 108.

As shown in FIG. 1, the computer network 108 can include one or more network nodes 112 that interconnect the multiple hosts 106, the client devices 102, and the usage manager 126. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The computer network can allow communication between hosts 106, the usage manager 126, and the users 101. In other embodiments, the multiple host sets 107a-107c may share a single network node 112 or can have other suitable arrangements.

The hosts 106 can individually be configured to provide computing, storage, communications, and/or other suitable cloud computing services to the users 101. For example, as described in more detail below with reference to FIGS. 2A-2D, the hosts 106 can initiate and provide a content sharing service such as Google Drive®, Apple Cloud®, Facebook®, etc. The users 101 can then upload, store, modify, and share content 144 (FIGS. 2A-2D) with one another via the computer network 108. In certain embodiments, a user 101 can have multiple accounts of the content sharing service provided by one or more of the hosts 106. In other embodiments, multiple users 101 can share a single account. In further embodiments, the content sharing service can allow group accounts or have other suitable configurations.

In accordance with several embodiments of the disclosed technology, the usage manager 126 can be configured to detect fraudulent account usage in the distributed computing system 100 without compromising user privacy. In the illustrated embodiment in FIG. 1, the usage manager 126 is shown as one or more physical servers interconnected to the hosts 106 via the computer network 108. In other embodiments, the usage manager 126 can include one or more of the hosts 106 with suitable instructions thereon. In further embodiments, the usage manager 126 can also be one or more computing services executing on one or more of the hosts 106.

In certain embodiments, the usage manager 126 can be configured to monitor for reported fraudulent usage of the provided computing services from the users 101 or other suitable entities. In one example, the computing services provided by the hosts 106 can include a weblink for reporting fraudulent account usage. In other embodiments, users 101 can report fraudulent account usage via emails, text messages, or other suitable communications channels. In other embodiments, a dedicated server or computing service (not shown) can manage the monitoring and processing of reports of fraudulent usage and provide a notice to the usage manager 126 when a report is received.

In response to detecting a reported fraudulent usage associated with a particular account of a computing service, the usage manager 126 can be configured to query the administrator 103 for confirmation that the reported fraudulent usage is indeed fraudulent. Upon receiving confirmation from the administrator 103, the usage manager 126 can be configured to "corrupt" data in the reported account, i.e., rendering any content (e.g., content violating service agreements or otherwise fraudulent) in the reported account unavailable to other users 101 while allowing the reported account remain accessible via the computer network. Thus, other users 101 attempting to retrieve any content from the reported account can still access the account but cannot retrieve any content from the account.

While the data in the reported account is corrupted, the usage manager 126 can be configured to collect and store data related to usage, access, behavior, or other characteristics of the account prior to and/or subsequent to corrupting data the account. Such data collection can continue until activities on the account cease or for a predetermined period of time. In certain embodiments, examples of collected data can include the following:

IP address (e.g., first 3 octets) of login activity;
IP address during creation of the account;
IP addresses of all shared users trying to access the content before and after corrupting the account;
Device type and/or browser used for accessing the prohibited content;
Device type and/or browser creating the content and/or the account;
Account name hosting the prohibited content;
Accounts that have accessed the prohibited content;
Folder structure (e.g., number, nesting patterns, etc.) of the account;
File structure in the account;
Number of files, types of files (e.g., file extensions), size of files, or other characteristics of the prohibited content in the account;
Percentage of account shared versus not shared;
Embedded meta-data of the prohibited content (e.g., type of camera used, resolution, or image/video dimensions);
Age of the account;
Age of the prohibited content uploaded and/or shared;
Shared globally versus shared explicitly with other accounts/users;
Use of other features on the account or the lack thereof (e.g. single device only, tags, extra folder, etc.);
Free or premium account; or
How long before the account owner tries to disable or other users stop visiting the content.

In other embodiments, the collected data can also include other suitable operational and/or configuration parameters associated with the account and/or content in the account.

The foregoing example data can be collected anonymously or non-anonymously with user consent. For example, during account registration, a user can be prompted for participating or opting out the data collection process. While consenting for such data collection, users can choose to send the information anonymously or non-anonymously. Upon user consent, such data can then be collected. When the collected usage data is not anonymous, the collected data can be anonymized to remove all personal identification information to safeguard personal privacy of the users. For example, the IP addresses listed above can be anonymized by removing all digits after the first two or three octets). In other embodiments, the collected data can also be aggregated or anonymized in other suitable manners.

The usage manager 126 can be configured to analyze the collected data associated with the reported account and other reported accounts to determine one or more commonalities among these accounts deemed to have fraudulent account usage. In certain embodiments, a statistical analysis can be performed on the collected data to determine a distribution or probability of a shared characteristic of the reported accounts. As one example, speech inciting violence may be shared 85% of the time with everyone right after the content is uploaded from an Android device. In another example, copyrighted content may be shared 90% of the time via a peer-to-peer sharing service. In other embodiments, graph-based clustering, bag-of-pattern, or other suitable techniques can also be applied to determine the one or more commonalities among the accounts.

Based on the determined one or more commonalities, the usage manager 126 can be configured to build a model of account behaviors that indicates fraudulent account usage with corresponding confidence levels. For instance, the model can indicate that an account shared with everyone right after uploading content from an Android device having a particular IP address range has a 99% chance of containing speech inciting violence. The model can also be continuously or periodically updated based on newly received indication and data related to accounts via machine learning, manual update, or other suitable techniques.

The usage manager 126 can also be configured to corrupt, block, or otherwise disable accounts with fraudulent account usage based on the built model. In certain embodiments, when a user 101 attempts to activate an account or to share content in the account, the usage manager 126 can be configured to compare activity characteristics associated with the account and/or content in the account with the model. If the account activity characteristics match or substantially match the model, the usage manager 126 can corrupt data in the account, or otherwise automatically block sharing of content in the account. In other embodiments, the usage manager 126 can also include developing a social graph among the reported accounts and determine a pattern of how such accounts interact with one other. Based on the determined pattern, the technique can include blocking additional accounts even before content sharing from these accounts are attempted. In further embodiments, the technique can include suspending a suspected account and allow the account be re-activated upon successful completion of certain user verification procedures. Example components of the usage manager 126 for performing the foregoing functions are described in more detail below with reference to FIGS. 2A-2D.

FIGS. 2A-2D are block diagrams of the distributed computing system 100 in FIG. 1 during certain stages of detecting fraudulent account usage in accordance with embodiments of the disclosed technology. In FIGS. 2A-2D and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated or other types of signals.

Figure 2A:
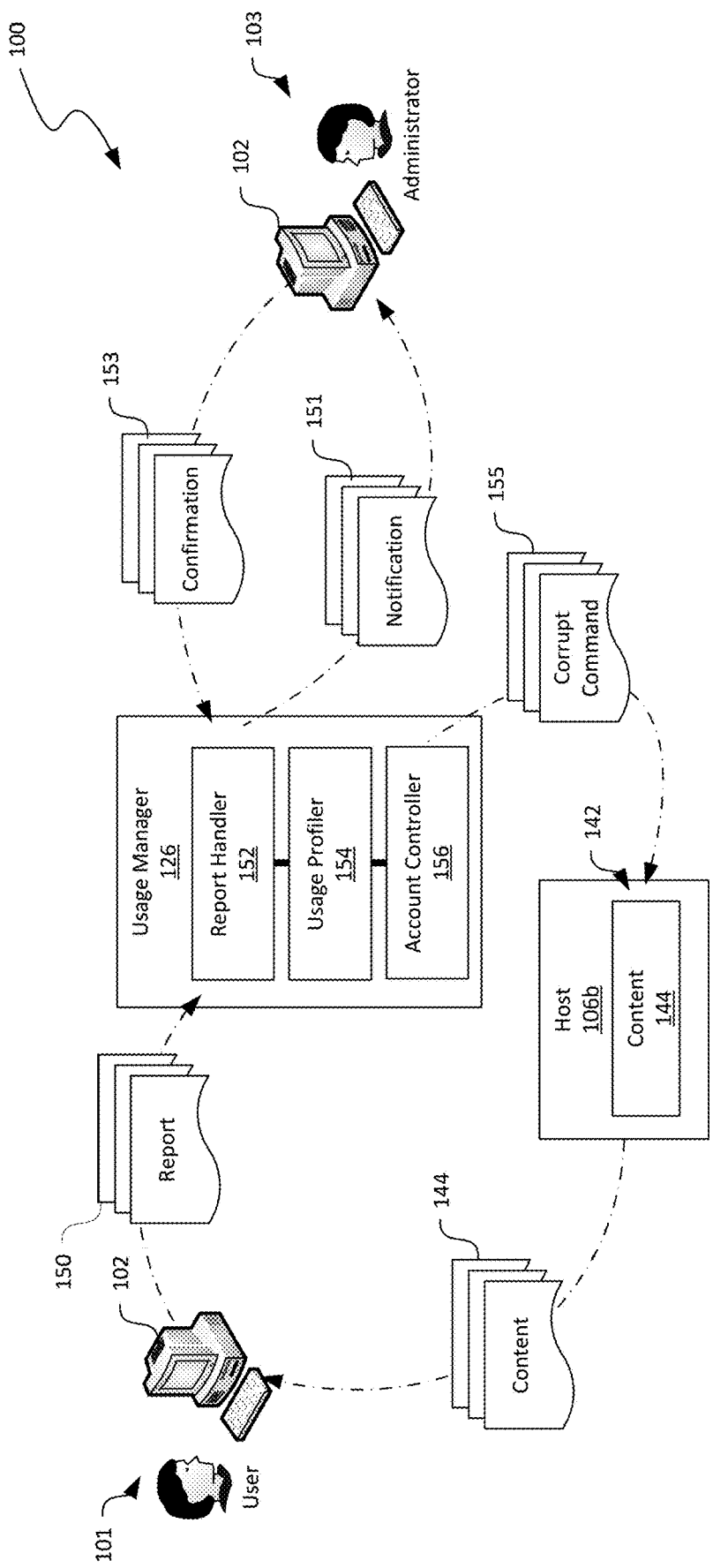
FIGS. 2A-2D are block diagrams of the distributed computing system in FIG. 1 during certain stages of detecting fraudulent account usage in accordance with embodiments of the disclosed technology.

As shown in FIG. 2A, the usage manager 126 can include a report handler 152, a usage profiler 154, and an account controller 156 operatively coupled to one another. Though only the foregoing components are shown in FIG. 2A, in other embodiments, the usage manager 126 can include additional and/or different components in addition to or in lieu of those shown in FIG. 2A. For example, in certain embodiments, the report handler 152 can be separate from other components of the usage manager 126. In further embodiments, the usage manager can also include input/output interfaces, database managers, or other suitable components (not shown).

The report handler 152 can be configured to handle reports of fraudulent account usage from users, government agencies, or other suitable entities. For example, as shown in FIG. 2A, a user 101 can encounter content 144 hosted on the host 106b and from an account 142 belonging to another user 101 (not shown). The user 101 may deem the content 144 to be a fraudulent use, for instance, by having copyrighted materials. In response, the user 101 can submit/transmit a report 150 via the computer network 108 (FIG. 1) to the report handler 152 of the usage manager 126. In certain embodiments, the report handler 152 can be configured to issue a notification 151 to the administrator 103 and request confirmation in response to the received report 150. In other embodiments, the report handler 152 can aggregate all the received reports 150 and allow the administrator 103 to retrieve the aggregated reports 150. In further embodiments, the report handler 152 can process any received reports 150 automatically or in other suitable manners.

In response to the notification 151, the administrator 103 can provide a confirmation 153 to the report handler 152 indicating that the reported account 142 is indeed a fraudulent use of the computing service. Upon receiving the confirmation 153, the report handler 152 can be configured to mark the reported account 142 as fraudulent and indicate to the account controller 156 accordingly. In response, the account controller 156 can be configured to corrupt data in the reported account 142 by issuing a corrupt command 155 to the host 106b.

Figure 2B:
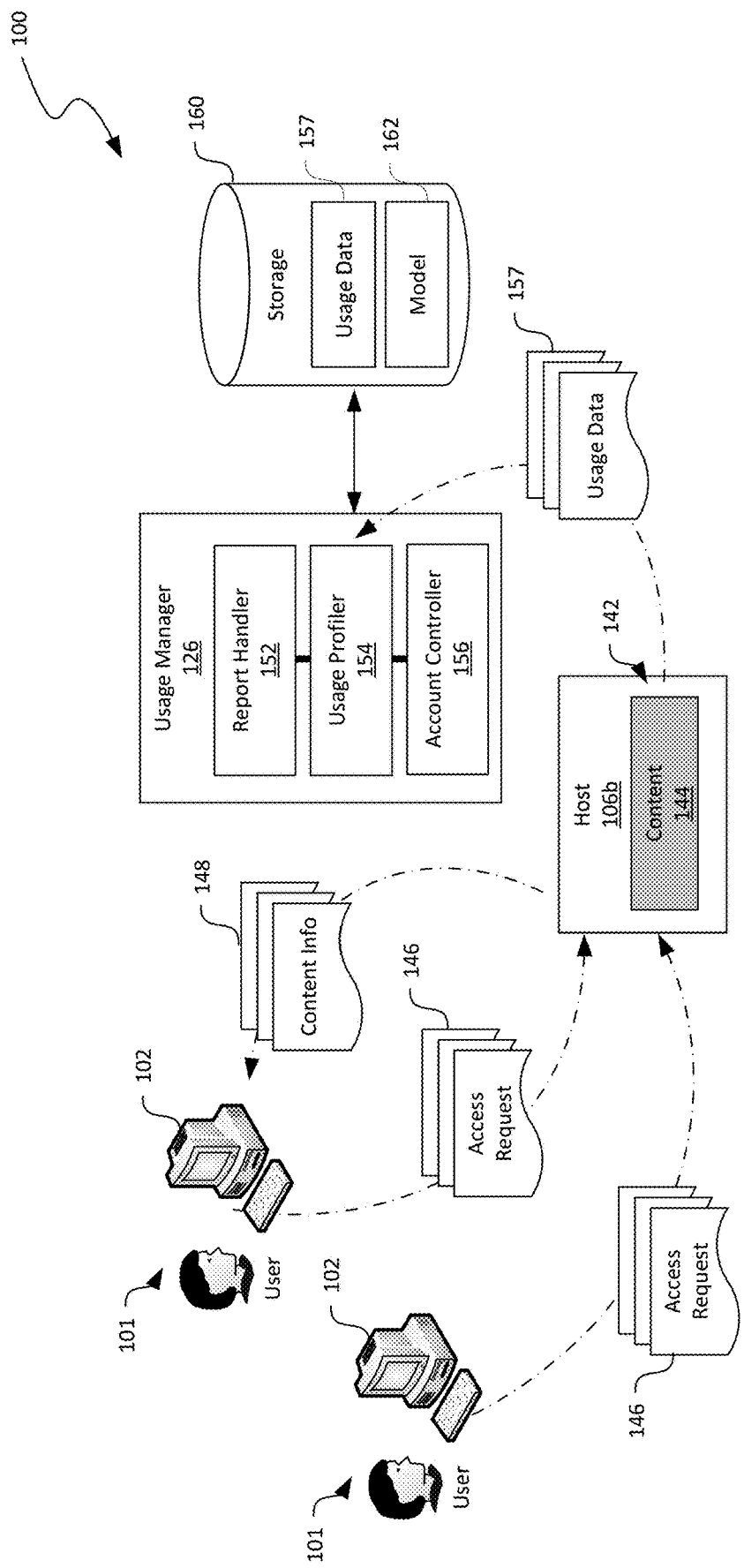

In response to the corrupt command 155, the host 106b can block access to the content 144 in the account 142 without taking down or closing the account 142. As shown in FIG. 2B, other users 101 can still access the account 142 via the computer network 108 but may not retrieve the content 144 (shown in shadings to reflect unavailability) from the account 142. For example, the users 101 can transmit an access request 146 to the host 106b. Instead of transmitting a reply indicating that the account 142 does not exist or has been removed, the host 106b can still identify the account as an existing and valid account and provide an identification or other suitable content information 148 of the content 144 to the users 101. For example, the content information 148 can include a list of the content items of the content 144, metadata (e.g., upload date/time) of the content 144, or other suitable information regarding the content 144. However, the users 101 cannot download, view, or otherwise access the content 144. In other examples, the host 106b can still allow uploads of additional content (not shown) to the account in response to the corrupt command 155 but block access to the uploaded additional content as described above.

The usage profiler 154 can be configured to collect usage data 157 associated with the account 142 from the host 106b prior and/or subsequent to corrupting data of the content 144 in the account 142 on the host 106b. Examples of such usage data 157 can include, for instance, IP addresses of the users 101 who attempted to access the content 144 prior and/or subsequent to corrupting data in the account 142. Other examples can also include the parameters discussed above with reference to FIG. 1.

The collected usage data 157 can be stored in a storage 160. In certain embodiments, the storage 160 can include a network storage location interconnected to the usage manager 126 via the computer network 108. In other embodiments, the storage 160 can include a persistent storage device (e.g., a hard disk drive or solid state device) that is a part of the usage manager 126, or other suitable types of storage device. The usage data 157 can be stored in the storage 160 as individual records associated with each account 142 and/or each user 101. An example data structure suitable for the usage data 157 is described in more detail below with reference to FIG. 4.

As shown in FIG. 2B, based on the collected usage data 157, the usage profiler 154 can be configured to develop a model 162 for predicting whether additional accounts 142 are associated with fraudulent account usage. In certain embodiments, the usage profiler 154 can be configured to perform a statistical analysis on the collected usage data 157 to determine a distribution or probability of a shared characteristic of the reported accounts 142. As one example, speech inciting violence may be shared 85% of the time with everyone right after the content is uploaded from an Android device. In another example, copyrighted content may be shared 90% of the time via a peer-to-peer sharing service. In other embodiments, graph-based clustering, bag-of-pattern, or other suitable techniques can also be applied to determine the one or more commonalities among the accounts 142.

Figure 2C:
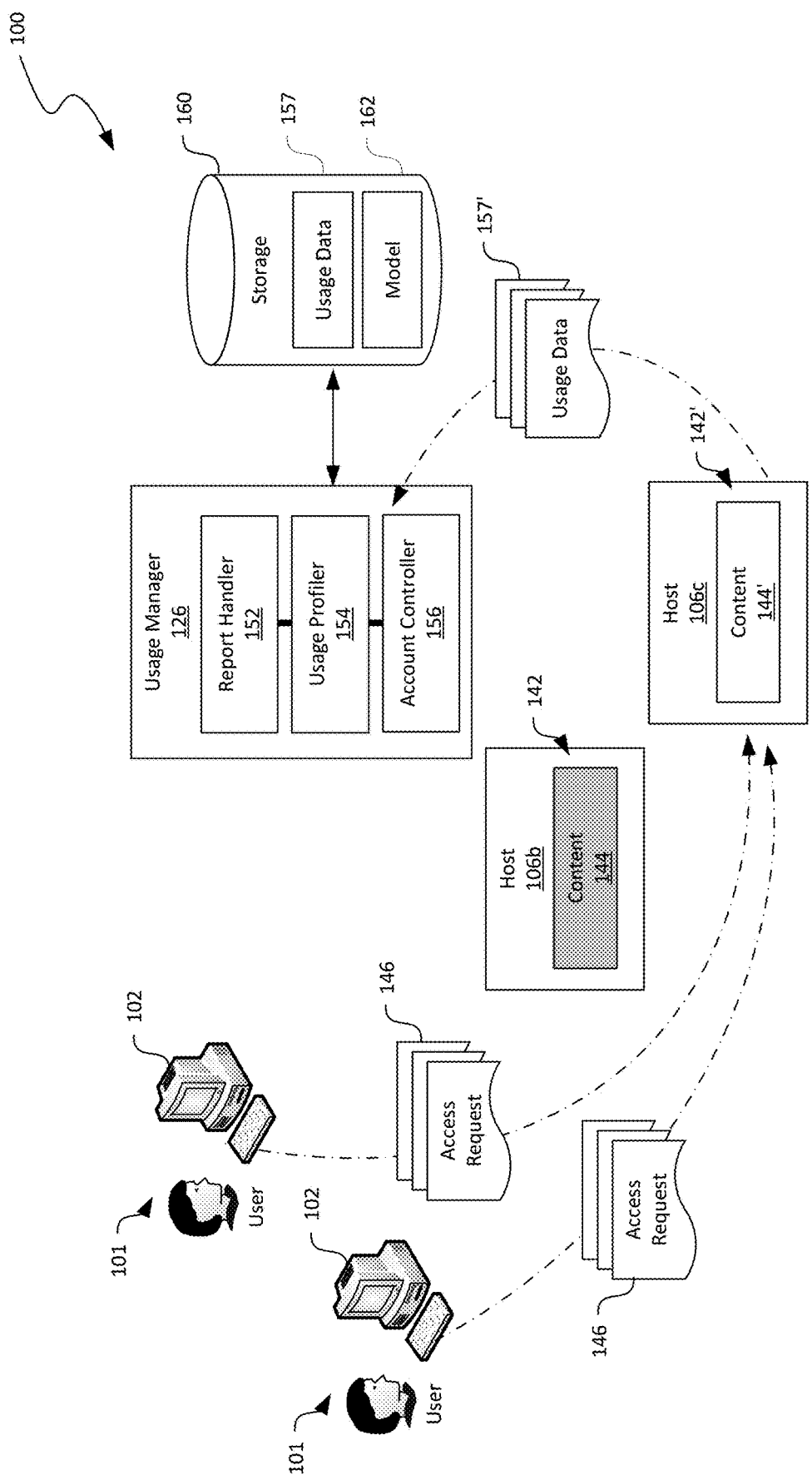
Figure 2D:
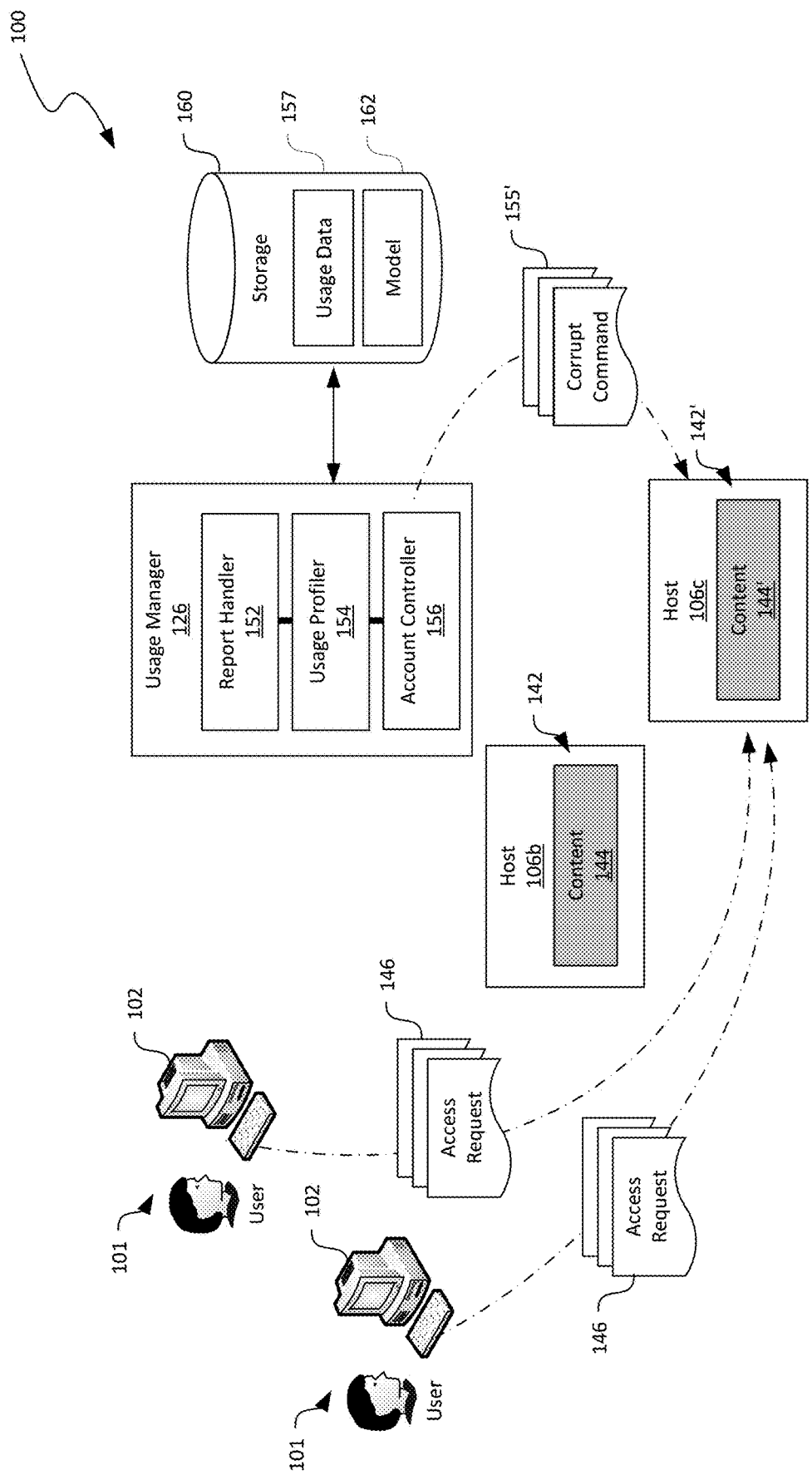

As shown in FIG. 2C, the account controller 156 can be configured to detect and automatically corrupt data in additional accounts deemed to have fraudulent account usage based on the developed model 162. For example, the account controller 156 can monitor for usage data 157' from another host 106c having another account 142' with content 144'. The account controller 156 can also be configured to compare the monitored usage data 157' with the developed model 162. In response to determining that the usage data 157' matches the model 162, for example, by having a characteristic or parameter similar to that in the developed model 162, assigning the same probability to the additional account 142'. When the assigned probability exceeds a threshold, the account controller 156 can indicate that the account 142' is related to fraudulent usage or at least a suspect for fraudulent account usage. As shown in FIG. 2D, in certain embodiments, the account controller 156 can issue another corrupt command 155' to the host 106c to corrupt data in the another account 142', and thus rendering the content 144' inaccessible without taking down the account 142'. Similar to the account 142, the usage manager 126 can continue to collect usage data 157' related to the account 142' generally similar to that shown in FIG. 2B.

Several embodiments of the disclosed technology can thus detect and interrupt fraudulent account usages of computing services without compromising user privacy. By maintaining a reported account 142 associated with fraudulent account usage accessible, the usage manager 126 can collect the usage data 157 with valuable insight into how such fraudulent account usage behave in the distributed computing system 100. Based on the collected usage data 157, a model 162 representing behavioral characteristics of the fraudulent account usage can be developed and used to automatically block further fraudulent account usage.

Figure 3A:
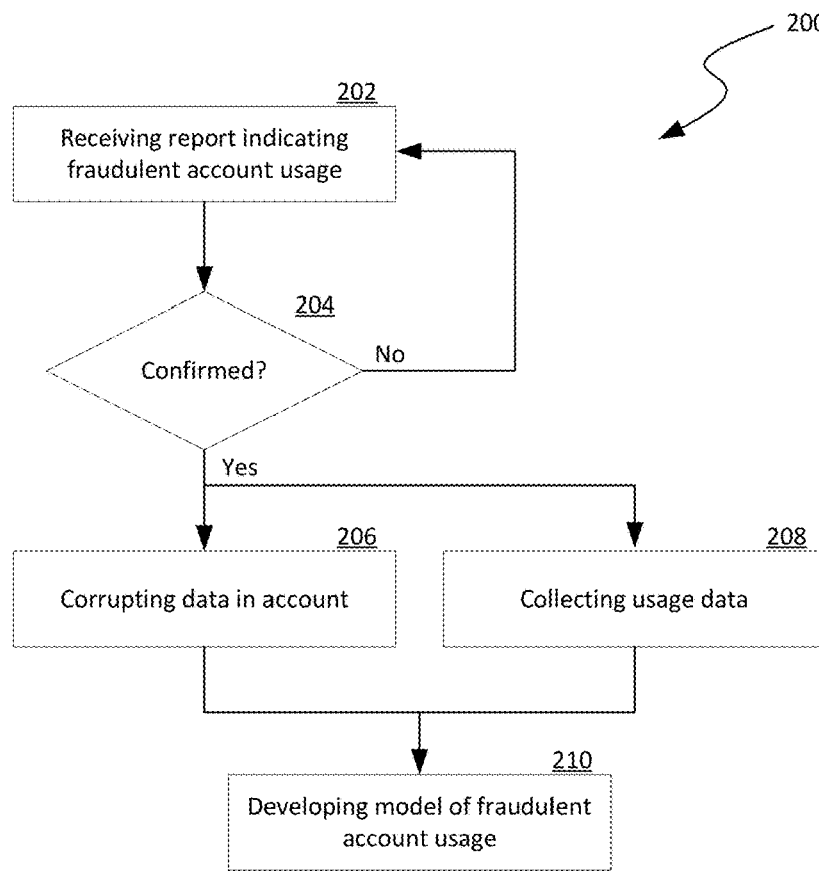
FIGS. 3A and 3B are flowcharts illustrating processes of detection of fraudulent account usage in a computing system in accordance with embodiments of the disclosed technology.

FIG. 3A is a flowchart illustrating a process 200 of detecting fraudulent account usage in a computing system in accordance with embodiments of the disclosed technology. Even though the process 200 is described in relation to the distributed computing system 100 of FIG. 1 and the hardware/software components of FIGS. 2A-2D, in other embodiments, the process 200 can also be implemented in other suitable systems.

As shown in FIG. 3A, the process 200 includes receiving one or more report indicating fraudulent account usage at stage 202. In certain embodiments, the reports can be received from other users. In other embodiments, the reports can also be received from government agencies, companies, institutions, or other suitable entities. In response to the received reports, the process 200 can include an optional stage 204 of querying an administrator for confirmation that the reported account(s) are indeed fraudulent. In response to determining that confirmation is not received, the process 200 can revert to receiving additional reports at stage 202.

In response to determining that confirmation is received, the process 200 can proceed to corrupting at a part of data in the reported account at stage 206 and collecting usage data of the reported account at stage 208. In certain embodiments, corrupting data in the account can include disabling access to any content in the account while maintaining the account active, i.e., without taking down the account. As such, the account can still be accessed and a list of content items may be retrieved. However, downloading or viewing of any of the content can be disabled. In other embodiments, corrupting data in the account can include removing all or a part of the content from the account while maintaining the account active. In certain embodiments, collecting the usage data can include collecting usage data prior to and subsequent to corrupting data in the account for a period of time (e.g., 30 days). In other embodiments, usage data can be collected until the account has no more activities for a certain period of time (e.g., 7 days).

The process 200 can also include developing a model of fraudulent account usage at stage 210. Developing the model can include applying aggregated statistical analysis on the collected usage data to determine one or more commonalities among the accounts, as described above with reference to FIGS. 2A-2D. In certain embodiments, the model can be continuously or periodically updated based on newly received reports and usage data related to accounts via machine learning. As such, the model can be adapted when behaviors of fraudulent accounts change. In other embodiments, the model can be updated in other suitable manners.

Figure 3B:
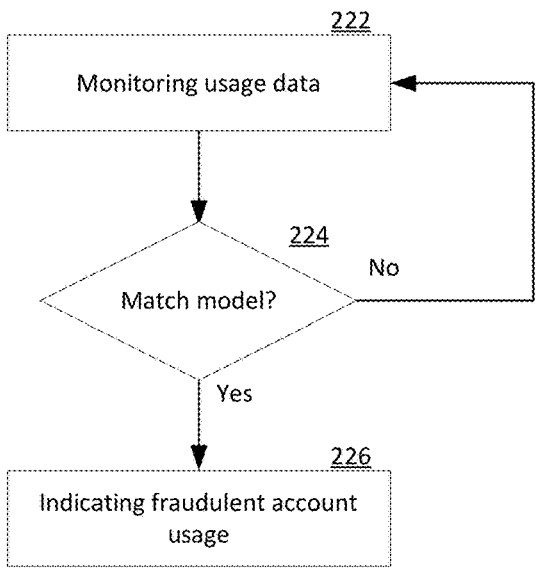

FIG. 3B is a flowchart illustrating a process 220 of blocking fraudulent account usage in accordance with embodiments of the disclosed technology. As shown in FIG. 3B, the process 220 can include monitoring usage data of accounts related to a computing service (e.g., a content sharing service) at stage 222. The process 220 can then include a decision stage 224 to determine whether the monitored usage data matches or substantially matches a model developed according to the process 200 described above with reference to FIG. 3A. In response to determining that the monitored usage data matches or substantially matches the model, the process 220 can include indicating that fraudulent account usage is detected for a particular account. In certain embodiments, the process 220 can include blocking, corrupting, data or otherwise disrupting content dissemination from the account. In other embodiments, the process 220 can include suspend the account and re-activate the account upon successful completion of certain user verification procedures.

Figure 5:
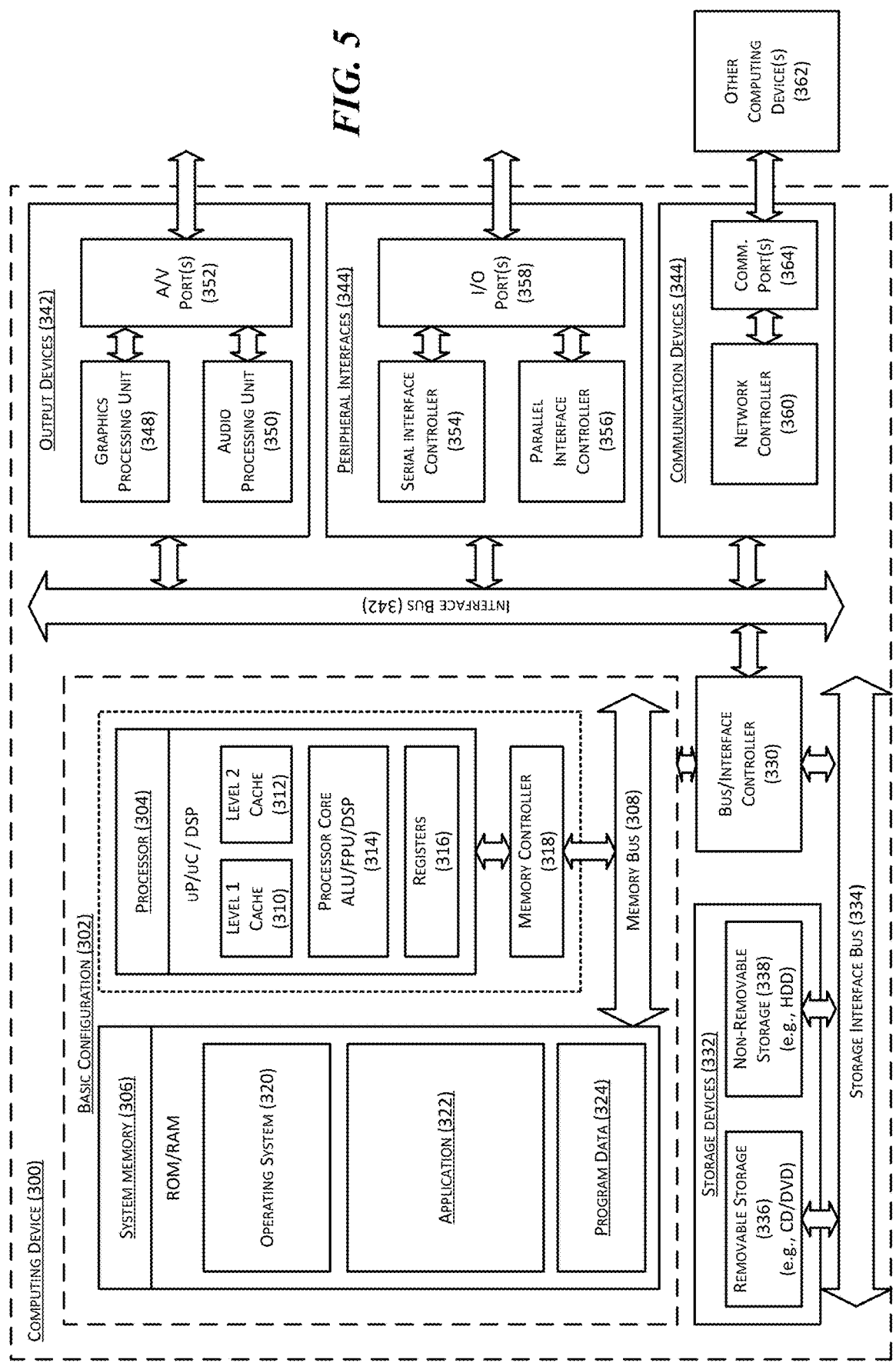
FIG. 5 is a computing device suitable for certain components of the distributed computing system in FIG. 1.

FIG. 5 is a computing device 300 suitable for certain components of the distributed computing system 100 in FIG. 1. For example, the computing device 300 can be suitable for the hosts 106, the client devices 102, or the usage manager 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu P$), a microcontroller ($\mu C$), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

I claim:

1. A method performed by a computing device in a distributed computing system having a plurality of servers interconnected by a computer network to provide a computing service, the method comprising:

receiving, via the computer network, data representing a report indicating fraudulent account usage related to an account of the computing service, the account having associated one or more content items accessible to users of other accounts of the same computing service; and in response to the received data representing the report indicating occurrence of fraudulent account usage of the account, disallowing access to any of the one or more content items associated with the account while maintaining the account as active such that the one or more content items are shown as present in the account but access by the users of the other accounts to view or download the one or more content items is disallowed, including:

receiving, from a user, an access request to access the disallowed one or more content items associated with the account; and in response to receiving the access request, indicating, to the user, that the account is a valid account;

providing, to the user, a list of the one or more content items associated with the account; and preventing any of the one or more content items in the list from being viewed or downloaded by the user;

collecting usage data related to the account or the content items associated with the account while the content items are shown as present in the account but the access to view or download the one or more content items in the account is disallowed;

developing a model representing an activity profile of accessing the account or the content items associated with the account based on, at least in part, the collected usage data while access to view or download the one or more content items is disallowed while the account is maintained as active; and detecting and deactivating one or more additional accounts of the computing service that are related to the reported fraudulent account usage based on the developed model without scanning one or more content items in the one or more additional accounts.

2. The method of claim 1 wherein the collected usage data includes one or more of the following parameters:

an IP address of any user logging into the account;

an IP address during creation of the account;

one or more IP addresses of all users trying to access the content items before or after the access to any content in the account is disallowed;

a device type or browser used for accessing the content items associated with the account;

a device type or browser creating the content items or the account;

an account name hosting the content items;

one or more accounts that have accessed one or more of the content items;

a folder structure of the account;

a file structure in the account;

a number of files, types of files, size of files, of the content items in the account;

a percentage of account shared versus not shared;

an embedded meta-data of the content;

an age of the account;

an age of the content uploaded or shared; or an indication of whether the content items are shared globally or shared explicitly with other accounts or users.

3. The method of claim 2 wherein developing the model includes applying statistical analysis on the collected usage data to identify a probability of the account being associated with fraudulent account usage when the collected usage data contains one or more of the parameters.

4. The method of claim 2 wherein:

developing the model includes applying statistical analysis on the collected usage data to identify a probability of the account being associated with fraudulent account usage when the collected usage data contains one or more of the parameters; and detecting the one or more additional accounts includes:
assigning the same probability to one of the one or more additional accounts when collected usage data of the one of the one or more additional accounts also contains the one or more of the parameters;
determining whether the assigned probability exceeds a threshold; and
in response to determining that the assigned probability exceeds a threshold, indicating that the one of the additional accounts is likely associated with fraudulent account usage.

5. The method of claim 4, further comprising:

disallowing access to any content items associated with the one of the one or more additional accounts without deactivating the one of the one or more additional accounts;

collecting additional usage data related to the one of the one or more additional accounts or the one or more content items associated with the one of the one or more additional accounts while the access to the content items is disallowed; and updating the model based on the collected additional usage data related to the one of the one or more additional accounts or the one or more content items associated with the one of the one or more additional accounts while the access to the one or more content items is disallowed.

6. The method of claim 1 wherein collecting the usage data includes collecting the usage data related to the account or the one or more content items associated with the account while the access to the one or more content items is disallowed until no more access request to access the disallowed content items is detected for a preset period of time.

7. The method of claim 1 wherein detecting one or more additional accounts includes:

comparing a usage profile of the individual one or more additional accounts with the developed model; and in response to determining that the usage profile of one of the one or more additional accounts matches that of the developed model, indicating that the one of the one or more additional accounts is potentially related to fraudulent account usage.

8. A computing device in a distributed computing system having a plurality of servers interconnected by a computer network for providing a computing service to users, comprising:

a processor and a memory operatively coupled to the processor, the memory containing instructions executable by the processor to cause the computing device to:
receive, via the computer network, an indication that usage of an account of the computing service violates a usage restriction imposed by a provider of the computing service or a government entity, the account having one or more content items accessible to users of other accounts of the same computing service; and
in response to the received indication,
disallow access to any of the one or more content items associated with the account while maintaining the account as being a valid account of the computing service such that the one or more content items are shown as present in the account but access to view or download the one or more content items by the users of the other accounts is disallowed, including to:
upon receiving, from a user, an access request to access the disallowed one or more content items associated with the account,
indicate, to the user, that the account is a valid account;
provide, to the user, a list of the one or more content items associated with the account; and
prevent any of the one or more content items in the list from being viewed or downloaded by the user;
collect usage data related to the account or the one or more content items associated with the account before and/or after disallowing access to the one or more content items associated with the account;
determine that another account of the computing service also violates the same usage restriction imposed by the provider of the computing service or the government entity by comparing the collected usage data related to the account having access to the one or more content items disallowed and usage data related to the additional account; and
deactivate the another account determined to violate the same usage restriction imposed by the provider of the computing service or the government entity.

9. The computing device of claim 8 wherein to receive the indication includes:

receive data representing a report from a user of the computing service, the report indicating that the usage of the account potentially violates the usage restriction imposed by the provider of the computing service or the government entity;

in response to receiving the data representing the report, query an administrator regarding the usage of the account; and receive the indication from the administrator that the usage of the account indeed violates the usage restriction imposed by the provider of the computing service or the government entity.

10. The computing device of claim 8 wherein the memory contains additional instructions executable by the processor to cause the computing device to:

receive a request to access the one or more content items associated with the account; and in response to receiving the request to access the one or more content items, provide only a list of the one or more content items without allowing access to view or download any of the one or more content items in the list.

11. The computing device of claim 8 wherein the memory contains additional instructions executable by the processor to cause the computing device to:

receive, from another user, a request to access the one or more content items associated with the account; and in response to receiving the request to access the one or more content items, record, as a part of the collected usage data, at least one of an IP address, a device type, a browser, or an account name related to the another user requesting access to the one or more content items.

12. The computing device of claim 8 wherein the memory contains additional instructions executable by the processor to cause the computing device to:

receive, from another user, a request to access the one or more content items associated with the account; and in response to receiving the request to access the one or more content items, provide, to the another user, only a list of the one or more content items without allowing access to view or download any of the one or more content items in the list; and record, as a part of the collected usage data, at least one of an IP address, a device type, a browser, or an account name related to the another user requesting access to the one or more content items.

13. The computing device of claim 8 wherein the memory contains additional instructions executable by the processor to cause the computing device to:

in response to determining that the another account of the computing service also violates the same usage restriction imposed by the provider of the computing service or the government entity, collect additional usage data related to the additional account or any content items associated with the additional account before and/or after disallowing access to the one or more content items associated with the additional account; and determine one or more commonalities between the collected usage data related to the account and the additional account.

14. The computing device of claim 8 wherein the memory contains additional instructions executable by the processor to cause the computing device to:

in response to determining that the another account of the computing service also violates the same usage restriction imposed by the provider of the computing service or the government entity, collect additional usage data related to the additional account or any content items associated with the additional account before and/or after disallowing access to the one or more content items associated with the additional account;

determine one or more commonalities between the collected usage data related to the account and the additional account; and determine that a further account of the computing service also violates the same usage restriction imposed by the provider of the computing service or the government entity by identifying that usage data related to the further account also contains the determined one or more commonalities.

15. The computing device of claim 14 wherein one or more commonalities include one or more of:

an IP address range from which the content items are uploaded;

to whom the uploaded content items are shared with;

when the content items are shared after being uploaded; or a device type of a device used to upload the content items.

16. A method performed by a computing device in a distributed computing system having a plurality of servers interconnected by a computer network to provide a computing service to users, the method comprising:

receiving indications that usage of multiple accounts of the computing service violates a usage restriction imposed by a provider of the computing service or a government entity, the multiple accounts individually having a content item accessible to users of other accounts of the same computing service;

in response to receiving the indications, continuing to present the multiple accounts as valid accounts of the computing service while preventing access to view or download any content items associated with the multiple accounts such that the content items are shown as present in the multiple accounts but cannot be viewed or downloaded by the users of the other accounts, including:

receiving, from a user, an access request to access the disallowed one or more content items associated with one of the multiple accounts; and in response to receiving the access request, indicating, to the user, that the one of the multiple accounts is a valid account;

providing, to the user, a list of the one or more content items associated with the one of the multiple accounts; and preventing any of the one or more content items in the list from being viewed or downloaded by the user;

collecting usage data related to the multiple accounts or to the content items associated with the multiple accounts while the content items are shown as present in the multiple accounts but access to view or download the content items in the multiple accounts is disallowed;

aggregating the collected usage data to identify a commonality of the multiple accounts;

determining whether usage of an additional account of the computing service also has the identified commonality; and in response to determining that the usage of the additional account also has the commonality, indicating that the additional account also violates the usage restriction and deactivating the additional account without accessing any content items in the additional account.

17. The method of claim 16 wherein the collected usage data includes one or more of the following parameters:

an IP address of any user logging into the account;

an IP address during creation of the account;

one or more IP addresses of all users trying to access the content items before or after the access to any content in the account is disallowed;

a device type or browser used for accessing the content items associated with the account;

a device type or browser creating the content items or the account;

an account name hosting the content items;

one or more accounts that have accessed one or more of the content items;
a folder structure of the account;
a file structure in the account;
a number of files, types of files, size of files, of the content items in the account;
a percentage of account shared versus not shared;
an embedded meta-data of the content;
an age of the account;
an age of the content uploaded or shared; or
an indication of whether the content items are shared globally or shared explicitly with other accounts or users.

18. The method of claim 16 wherein the commonality includes one or more of:
an IP address range from which the content items are uploaded;
to whom the uploaded content items are shared with;
when the content items are shared after being uploaded; or
a device type of a device used to upload the content items.

19. The method of claim 16 wherein collecting the usage data includes collecting the usage data related to the multiple accounts or to the content items associated with the multiple accounts while continuing to present the multiple accounts as valid accounts.

* * * * *